Oct. 12, 1926.

E. L. HUMPHREY

ANTISKID DEVICE

Filed March 11, 1925

1,602,432

Inventor

E. L. Humphrey.

By Clarence O'Brien

Attorney

Patented Oct. 12, 1926.

1,602,432

UNITED STATES PATENT OFFICE.

EDWARD L. HUMPHREY, OF MECHANICSVILLE, NEW YORK.

ANTISKID DEVICE.

Application filed March 11, 1925. Serial No. 14,747.

This invention relates to an improved anti-skid device adapted to be used in connection with automobile wheels and the like, and it has for its principal object to provide a device of this class which will well serve particularly to prevent side skidding.

An important aim is to provide a device of this class which is of comparative simplicity and durability, which is so designed that it can readily be attached and detached, one which is very inexpensive to both the manufacturer and the user, and so constructed as to render it highly practical and efficient in operation.

Other features and advantages of the invention will become apparent from the following description and drawing.

In the accompanying drawing forming a part of this application and in which like numerals are employed to designate like parts throughout the same:

Figure 1:
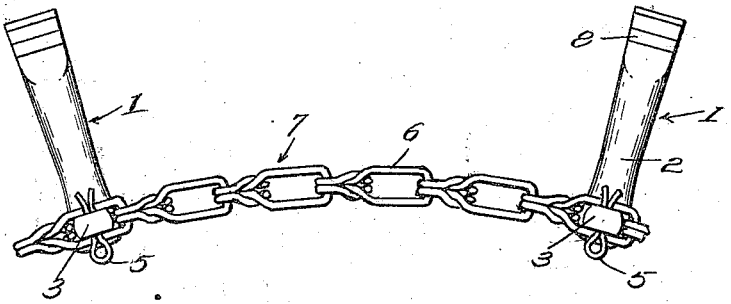
Figure 1 is a side elevation of a pair of the anti-skid devices showing a portion of a side chain serving as a connector therebetween.
Figure 2:
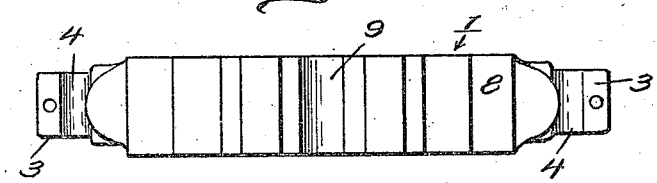
Figure 2 is a top plan view of one of the anti-skid devices.
Figure 3:
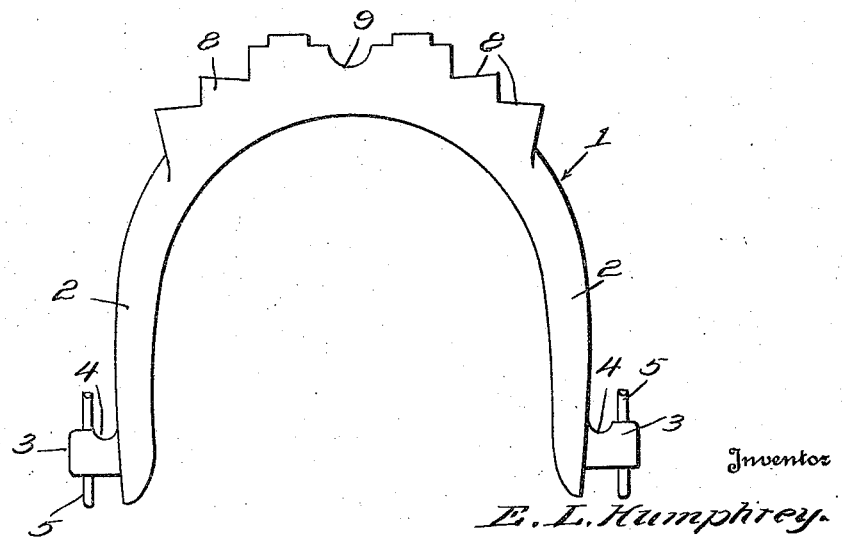
Figure 3 is an end elevation of the device shown in Figure 2.

Referring to the drawings in detail, it will be seen that the anti-skid device is generally designated by the reference character 1, the same being composed of one piece of material, which is substantially U-shaped in order to enable it to conform approximately to the tire or wheel tread which it is adapted to partially encircle. The arms 2 are provided adjacent their free ends with angularly disposed extensions 3, these extensions being formed in their tops with grooves 4. Beyond the grooves these extensions are formed with vertical holes and cotter pins or the like 5 are adapted to be inserted through these holes for holding elongated links 6 of an appropriate side chain 7 in place. As indicated in Figure 1 the extension 3 is adapted to project through and beyond one of the links of the side chains with the link seated in the groove 4. Obviously, the link is held in place upon the extension by the removable cotter pin 5. This affords an ideal and highly desirable connection which enables the device to be readily attached to or detached from the side chain. The tread of the device is provided with stepped serrations 8 which serve to produce novel antislipping means. At the center of the tread is a groove 9 which is disposed inwardly of the surfaces of the adjacent serrations. Obviously, the devices are adapted to extend crosswise of the tire or wheel, as the case may be, the same being detachably fastened to the side chains as shown in Figure 1. When in place, the serrated portions will serve to effectively guard against side slipping.

It is thought that persons skilled in the art, considering the description in connection with the drawings will be enabled to obtain a clear understanding of the invention. Therefore, a more lengthy description is thought unnecessary.

While the preferred embodiment of the invention has been shown and described, it is to be understood that minor changes coming within the scope of the invention claimed may be resorted to if desired.

Having thus described the invention, what I claim as new is:—

An anti-skid device of the class described comprising a substantially U-shaped member adapted to extend transversely across the tread of the tire of an automobile wheel, the bight portion of said member being provided with anti-skid means, lateral extensions projecting from the free end portions of the arms of said U-shaped member, said extension being substantially rectangular in cross section and adapted to project through elongated links of a pair of conventional side chains, the upper faces of the projections being provided with grooves for reception of adjacent portions of the links, and removable cotter pins extending vertically through the outer ends of the lateral extensions for preventing the displacement of the side chains from said extensions.

In testimony whereof I affix my signature.

EDWARD L. HUMPHREY.